(12) United States Patent
Takahashi

(10) Patent No.: US 6,319,961 B1
(45) Date of Patent: Nov. 20, 2001

(54) ETHYLENE RESIN FOAMED PRODUCTS

(75) Inventor: Mamoru Takahashi, Waki-cho (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/646,481

(22) PCT Filed: Jan. 19, 1999

(86) PCT No.: PCT/JP99/00158

§ 371 Date: Sep. 19, 2000

§ 102(e) Date: Sep. 19, 2000

(51) Int. Cl.[7] .................................................. C08J 9/00
(52) U.S. Cl. .................... 521/143; 521/142; 521/143; 521/79
(58) Field of Search ................... 521/142, 143, 521/144, 79

(56) References Cited

PUBLICATIONS

Japanese Abstract Application No. 07233883 Pub. No. 09077893 A.*

Japanese Abstract Application No. 06002695 Pub. No. 07207054 A.*

* cited by examiner

*Primary Examiner*—Morton Foelak

(57) ABSTRACT

The present invention provides an ethylene resin foamed product containing uniform cells and having excellent appearance, toughness and flexibility. The ethylene resin foamed product comprises an ethylene/α-olefin copolymer having the following properties: the density is in the range of 0.880 to 0.940 g/cm$^3$; the melt flow rate (MFR) at 190° C. under a load of 2.16 kg is in the range of 0.1 to 20 g/10 min; the decane-soluble component fraction (W) at room temperature and the density (d) satisfy the relation $W<80\times\exp(-100(d-0.88))+0.1$ in case of MFR$\leq$10 g/10 min and the relation $W<80\times(MFR-9)^{0.26}\times\exp(-100(d-0.88))+0.1$ in case of MFR>10 g/10 min; and the temperature (TM) at the maximum peak position in the endothermic curve as measured by a differential scanning calorimeter and the density (d) satisfy the relation $Tm<400\times d-250$.

11 Claims, No Drawings

ETHYLENE RESIN FOAMED PRODUCTS

TECHNICAL FIELD

The present invention relates to ethylene resin foamed products comprising ethylene copolymers, and more particularly to foamed products containing uniform cells and having excellent appearance, toughness and heat resistance.

BACKGROUND ART

Ethylene resin foamed products have excellent flexibility and heat insulating properties, so that they have been hitherto applied to various uses as cushioning materials or heat insulating materials. The type of a polyethylene resin is selected according to the use purpose of the resulting foamed product. For example, when the foamed product requires flexibility, low-density polyethylene is used, and when the foamed product requires toughness, linear low-density polyethylene or a resin composition consisting of low-density polyethylene and linear low-density polyethylene is used (see Japanese Patent Publication No. 57334/1986).

The linear low-density polyethylene is a copolymer of ethylene and an α-olefin, and in order to enhance flexibility, a resin produced using an increased amount of an α-olefin that is a comonomer component is used. In such a resin, however, a low-molecular weight polymer portion in which the comonomer component is introduced into the molecular chains and a high-molecular weight polymer portion in which the comonomer component is rarely introduced are present separately from each other, so that a wide scatter of melt viscosity value occurs in the resin to thereby lower foamability of the resin. For example, the expansion ratio does not increase, or even if a foamed product having a satisfactory expansion ratio is obtained, the product has a problem in appearance such as protrusions or depressions, or the product contains both of extremely large cells and small cells and is broken from the ununiformly foamed portion during the forming process.

As tape substrates or sheet substrates used for compress materials or anti-inflammatory analgesic plasters, foamed products of small thickness are used instead of cloths or flexible synthetic resins, and such tape substrates or sheet substrates are required to have flexibility and toughness (favorable extensibility and tensile strength). As the tape substrates or the sheet substrates of this kind, crosslinked foamed products comprising a resin composition consisting of an ethylene/vinyl acetate copolymer and linear low-density polyethylene have been proposed (Japanese Patent Publication No. 33387/1990). The crosslinked foamed products as tape substrates, however, have bad balance between flexibility and toughness. If the amount of the ethylene/vinyl acetate copolymer is increased in order to obtain products of more flexibility, the tensile strength of the products is lowered.

The conventional polyethylene resins are markedly lowered in the viscosity when they are exposed to high temperatures or subjected to melting, so that crosslinking is generally made to ensure viscoelasticity of such a level as required in the foaming process and to retain the produced cells. For crosslinking the polyethylene resins, various methods such as an irradiation crosslinking method using ionizing radiation, a peroxide crosslinking method in which resin radicals are produced by a peroxide to perform crosslinking, crosslinking method adding a multifunctional monomer in the produced radicals and a crosslinking method by means of silanol condensation (silane crosslinking method) have been industrially carried out. Uncrosslinked polyethylene resin foamed products are industrially produced by dispersing or dissolving in a resin a substance that is gasified at ordinary temperature and atmospheric pressure or upon heating, such as carbonic acid gas, methanol, water or flon, and subjecting the dispersion or the solution to extrusion foaming or batch foaming.

The conventional resins, however, are difficult to control degree of crosslinking, and it is not easy to produce crosslinked foamed products of certain qualities. Further, when the conventional polyethylene resins are not crosslinked, the viscosity of the resins is markedly lowered under the foaming conditions as described above, and hence it is very difficult to obtain uncrosslinked foamed products. In particular, it is difficult to produce conventional uncrosslinked polyethylene foamed products as continuous sheet products, although it is possible to produce them as small-area products such as rod or tubular products.

The present invention is intended to solve such problems associated with the prior art as described above, and it is an object of the invention to provide ethylene resin foamed products containing uniform cells and having excellent appearance, toughness and flexibility.

DISCLOSURE OF THE INVENTION

The ethylene resin foamed product according to the present invention comprises an ethylene/α-olefin copolymer which is a copolymer of ethylene and an α-olefin of 3 to 12 carbon atoms and meets the following requirements:

(i) the density is in the range of 0.880 to 0.940 g/cm$^3$, (ii) the melt flow rate (MFR) at 190° C. under a load of 2.16 kg is in the range of 0.1 to 20 g/10 min, (iii) the decane-soluble component fraction (W (% by weight)) at room temperature and the density (d (g/cm$^3$)) satisfy the following relation
in case of MFR$\leq$10 g/10 min:

$$W<80\times\exp(-100(d-0.88))+0.1,$$

in case of MFR>10 g/10 min:

$$W<80\times(MFR-9)^{0.26}\times\exp(-100(d-0.88))+0.1,$$

and (iv) the temperature (Tm (° C.)) at the maximum peak position in the endothermic curve as measured by a differential scanning calorimeter (DSC) and the density (d (g/cm$^3$)) satisfy the following relation $$Tm<400\times d-250.$$

The ethylene/α-olefin copolymer is desired to further meet, in addition to the requirements (i) to (iv), the following requirements:

(v) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation $$FI>75\times MFR,$$

and (vi) the melt tension (MT(g)) at 190° C. and the melt flow rate (MFR (g/10 min)) satisfy the following relation
$$MT>2.2\times MFR^{-0.84}.$$

The ethylene/α-olefin copolymer is also desired to further meet, in addition to the requirements (i) to (iv), the following requirements:

(vii) the flow index (FI (1/sec)), which is defined as a shear rate at which the shear stress of said copolymer in a molten state at 190° C. reaches $2.4 \times 10^6$ dyne/cm$^2$, and the melt flow rate (MFR (g/10 min)) satisfy the following relation

FI>150×MFR, and (viii) the melt tension (MT (g)) at 190° C. and the melt flow rate (MFR (g/10 min)) satisfy the following relation

MT>4.0×MFR$^{-0.65}$.

The ethylene/α-olefin copolymer is also desired to further meet, in addition to the requirements (i) to (iv), the following requirements:

(ix) the flow index (FI (1/sec)), which is defined as a shear rate at which the shear stress of said copolymer in a molten state at 190° C. reaches $2.4 \times 10^6$ dyne/cm$^2$, and the melt flow rate (MFR (g/10 min)) satisfy the following relation

FI≦75×MFR.

The ethylene/α-olefin copolymer is preferably a copolymer obtained by copolymerizing ethylene and an α-olefin of 3 to 12 carbon atoms in the presence of an olefin polymerization catalyst comprising:

(a) a compound of a transition metal of Group IV of the periodic table, which contains a ligand having cyclopentadienyl skeleton, and (b) an organoaluminum oxy-compound.

The ethylene/α-olefin copolymer mentioned above is favorable for producing foamed products.

It is preferable that when the ethylene resin foamed product of the invention is subjected to a temperature rise elution test (TREF), a component that is eluted at a temperature of not lower than 100° C. is present and the amount of the component that is eluted at a temperature of not lower than 100° C. is not more than 10% of the whole elution amount.

The ethylene resin foamed product according to the present invention preferably comprises crosslinked polyethylene obtained by crosslinking the ethylene/α-olefin copolymer.

BEST MODE FOR CARRYING OUT THE INVENTION

The ethylene resin foamed product according to the invention is described in detail hereinafter.

Ethylene/α-olefin copolymer

The ethylene/α-olefin copolymer for producing an ethylene resin foamed product of the invention is a copolymer of ethylene and an α-olefin of 3 to 12 carbon atoms.

In the copolymer, constituent units derived from ethylene are desired to be present in amounts of 55 to 99% by weight, preferably 65 to 98% by weight, more preferably 70 to 96% by weight, and constituent units derived from the α-olefin of 3 to 12 carbon atoms are desired to be present in amounts of 1 to 45% by weight, preferably 2 to 35% by weight, more preferably 4 to 30% by weight.

Examples of the α-olefins of 3 to 12 carbon atoms include propylene, 1-butene, 1-pentene, 1-hexene, 4-methyl-1-pentene, 1-octene, 1-decene and 1-dodecene.

The ethylene/α-olefin copolymer meets the following requirements (i) to (iv).

(i) The density of the ethylene/α-olefin copolymer is in the range of 0.880 to 0.940 g/cm$^3$, preferably 0.900 to 0.940 g/cm$^3$.

(ii) The melt flow rate (MFR) of the ethylene/α-olefin copolymer is in the range of 0.1 to 20 g/10 min, preferably 0.3 to 10 g/10 min.

(iii) The n-decane-soluble component fraction (W (% by weight)) in the ethylene/α-olefin copolymer at room temperature and the density (d (g/cm$^3$)) of the copolymer satisfy the following relation in case of MFR≦10 g/10 min:

W<80×exp(−100(d−0.88))+0.1, preferably W<60×exp(−100(d−0.88))+0.1, in case of MFR>10 g/10 min:

W<80×(MFR−9)$^{0.26}$×exp(−100(d−0.88))+0.1.

(iv) The temperature (Tm (° C.)) at the maximum peak position in the endothermic curve of the ethylene/α-olefin copolymer as measured by a differential scanning calorimeter (DSC) and the density (d (g/cm$^3$)) of the copolymer satisfy the following relation Tm<400×d−250, preferably Tm<450×d−297.

An ethylene resin foamed product produced from the ethylene/α-olefin copolymer meeting the above requirements contains uniform cells and has excellent heat resistance.

The ethylene/α-olefin copolymer is desired to further meet the following requirements (v) to (vi) in addition to the requirements (i) to (iv).

(v) The flow index (FI (1/sec)), which is defined as a shear rate at which the shear stress of the ethylene/α-olefin copolymer in a molten state at 190° C. reaches $2.4 \times 10^6$ dyne/cm$^2$, and the melt flow rate (MFR (g/10 min)) of the copolymer satisfy the following relation

FI>75×MFR, preferably FI≧150×MFR, more preferably FI≦250×MFR.

(vi) The melt tension (MT (g)) at 190° C. and the melt flow rate (MFR (g/10 min)) satisfy the following relation

MT>2.2×MFR$^{-0.84}$, preferably MT>4.0×MFR$^{-0.65}$, more preferably MT>5.0×MFR$^{-0.65}$.

An ethylene resin foamed product produced from the ethylene/α-olefin copolymer meeting the above requirements contains uniform cells and has excellent heat resistance. Moreover, the ethylene resin foamed product is excellent particularly in foam properties when it is in the uncrosslinked state.

The ethylene/α-olefin copolymer is also desired to further meet the following requirements (vii) in addition to the requirements (i) to (iv).

(vii) The flow index (FI (1/sec)), which is defined as a shear rate at which the shear stress of said copolymer in a molten state at 190° C. reaches $2.4 \times 10^6$ dyne/cm$^2$, and the melt flow rate (MFR (g/10 min)) satisfy the following relation

FI≦75×MFR.

An ethylene resin foamed product produced from the ethylene/α-olefin copolymer meeting the above requirements contains uniform cells and has excellent heat resistance and tensile properties.

It is desirable that when the ethylene resin foamed product is subjected to a temperature rise elution test (TREF), a component that is eluted at a temperature of not lower than 100° C. is present and the amount of the component that is eluted at a temperature of not lower than 100° C. is not more than 10%, preferably 0.5 to 8%, of the whole elution amount.

The olefin polymerization catalyst and the catalyst components are described below.

The ethylene/α-olefin copolymer for use in the invention can be prepared by, for example, copolymerizing ethylene and an α-olefin of 3 to 20 carbon atoms in the presence of an olefin polymerization catalyst comprising:

(a) a compound of a transition metal of Group IV of the periodic table, which contains a ligand having cyclopentadienyl skeleton, (b) an organoaluminum oxy-compound, (c) a carrier, and optionally (d) an organoaluminum compound.

(a) Transition Metal Compound

The olefin polymerization catalyst and the catalyst components are described below.

The compound (a) of a transition metal of Group IV of the periodic table, which contains a ligand having cyclopentadienyl skeleton, (sometimes referred to as a "component (a)" hereinafter) is specifically a transition metal compound represented by the following formula (I) or (II).

$$MKL^1_{x-2} \qquad (I)$$

wherein M is a transition metal atom selected from Group IVB of the periodic table; K and $L^1$ are each a ligand coordinated to the transition metal atom; the ligand K is a bidentate ligand wherein the same or different groups selected from indenyl groups, substituted indenyl groups and their partially hydrogenated products are linked through a lower alkylene group; the ligand $L^1$ is a hydrocarbon group of 1 to 12 carbon atoms, an alkoxy group, an aryloxy group, a halogen atom, a trialkylsilyl group or a hydrogen atom; and x is a valence of the transition metal atom M.

$$ML^2_x \qquad (II)$$

wherein M is a transition metal selected from Group IV of the periodic table; $L^2$ is a ligand coordinated to the transition metal atom, at least two ligands $L^2$ are each a substituted cyclopentadienyl group having 2 to 5 substituents selected from methyl and ethyl, and the ligand $L^2$ other than the substituted cyclopentadienyl group is a hydrocarbon group of 1 to 12 carbon atoms, an alkoxy group, an aryloxy group, a halogen atom, a trialkylsilyl group or a hydrogen atom; and x is a valence of the transition metal atom M.

In the formula (I), M is a transition metal atom selected from Group IV of the periodic table, specifically zirconium, titanium or hafnium, preferably zirconium.

K is a ligand coordinated to the transition metal atom, and is a bidentate ligand wherein the same or different groups selected from indenyl groups, substituted indenyl groups and partially hydrogenated products of indenyl groups and substituted indenyl groups are linked through a lower alkylene group.

Examples of such ligands include an ethylenebisindenyl group, an ethylenebis(4,5,6,7-tetrahydro-1-indenyl) group, an ethylenebis(4-methyl-1-indenyl) group, an ethylenebis(5-methyl-1-indenyl) group, an ethylenebis(6-methyl-1-indenyl) group and an ethylenebis(7-methyl-1-indenyl) group.

$L^1$ is a hydrocarbon group of 1 to 12 carbon atoms, an alkoxy group, an aryloxy group, a halogen atom, a trialkylsilyl group or a hydrogen atom.

Examples of the hydrocarbon groups of 1 to 12 carbon atoms include alkyl groups, cycloalkyl groups, aryl groups and aralkyl groups. More specifically, here can be mentioned alkyl groups, such as methyl, ethyl, n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

An example of the aryloxy group is phenoxy.

The halogen atom is fluorine, chlorine, bromine or iodine.

Examples of the trialkylsilyl groups include trimethylsilyl, triethylsilyl and triphenylsilyl.

Examples of the transition metal compounds represented by the formula (I) include:

ethylenebis(indenyl)zirconium dichloride, ethylenebis(4-methyl-1-indenyl)zirconium dichloride, ethylenebis(4,5,6,7-tetrahydro-1-indenyl)zirconium dichloride, ethylenebis(5-methyl-1-indenyl)zirconium dichloride, ethylenebis(6-methyl-1-indenyl)zirconium dichloride, ethylenebis(7-methyl-1-indenyl)zirconium dichloride, ethylenebis(4-methyl-1-indenyl)zirconium dibromide, ethylenebis(4-methyl-1-indenyl)zirconium methoxychloride, ethylenebis(4-methyl-1-indenyl)zirconium ethoxychloride, ethylenebis(4-methyl-1-indenyl)zirconium butoxychloride, ethylenebis(4-methyl-1-indenyl)zirconium methoxide, ethylenebis(4-methyl-1-indenyl)zirconium methylchloride, ethylenebis(4-methyl-1-indenyl)zirconium dimethyl, ethylenebis(4-methyl-1-indenyl)zirconium benzylchloride, ethylenebis(4-methyl-1-indenyl)zirconium dibenzyl, ethylenebis(4-methyl-1-indenyl)zirconium phenylchloride, and ethylenebis(4-methyl-1-indenyl)zirconium hydride chloride.

In the present invention, transition metal compounds wherein a zirconium metal is replaced with a titanium metal or a hafnium metal in the above-mentioned zirconium compounds are also employable.

Of the above transition metal compounds represented by the formula (I), particularly preferable are:

ethylenebis(indenyl)zirconium dichloride, ethylenebis(4-methyl-1-indenyl)zirconium dichloride, and ethylenebis(4,5,6,7-tetrahydro-1-indenyl)zirconium dichloride.

In the formula (II), M is a transition metal atom selected from Group IV of the periodic table, specifically zirconium, titanium or hafnium, preferably zirconium.

$L^2$ is a ligand coordinated to the transition metal atom M, and at least two ligands $L^2$ are each a substituted cyclopentadienyl group having 2 to 5 substituents selected from methyl and ethyl. The ligands may be the same or different.

The substituted cyclopentadienyl group is a substituted cyclopentadienyl group having two or more substituents, preferably a cyclopentadienyl group having 2 to 3 substituents, more preferably a di-substituted cyclopentadienyl group, particularly preferably a 1,3-substituted cyclopentadienyl group. The substituents may be the same or different.

In the formula (II), the ligand $L^2$ other than the substituted cyclopentadienyl group coordinated to the transition metal atom M is a hydrocarbon group of 1 to 12 carbon atoms, an alkoxy group, an aryloxy group, a halogen atom, a trialkylsilyl group or a hydrogen atom.

Examples of the transition metal compounds represented by the formula (II) include:
bis(cyclopentadienyl)zirconium dichloride,
bis(methylcyclopentadienyl)zirconium dichloride,
bis(ethylcyclopentadienyl)zirconium dichloride,
bis(n-propylcyclopentadienyl)zirconium dichloride,
bis(n-butylcyclopentadienyl)zirconium dichloride,
bis(n-hexylcyclopentadienyl)zirconium dichloride,
bis(methyl-n-propylcyclopentadienyl)zirconium dichloride,
bis(methyl-n-butylcyclopentadienyl)zirconium dichloride,
bis(dimethyl-n-butylcyclopentadienyl)zirconium dichloride,
bis(n-butylcyclopentadienyl)zirconium dibromide,
bis(n-butylcyclopentadienyl)zirconium methoxychloride,
bis(n-butylcyclopentadienyl)zirconium ethoxychloride,
bis(n-butylcyclopentadienyl)zirconium butoxychloride,
bis(n-butylcyclopentadienyl)zirconium ethoxide,
bis(n-butylcyclopentadienyl)zirconium methylchloride,
bis(n-butylcyclopentadienyl)zirconium dimethyl,
bis(n-butylcyclopentadienyl)zirconium benzylchloride,
bis(n-butylcyclopentadienyl)zirconium dibenzyl,
bis(n-butylcyclopentadienyl)zirconium phenylchloride,
bis(n-butylcyclopentadienyl)zirconium hydride chloride,
bis(dimethylcyclopentadienyl)zirconium dichloride,
bis(diethylcyclopentadienyl)zirconium dichloride,
bis(methylethylcyclopentadienyl)zirconium dichloride,
bis(dimethylethylcyclopentadienyl)zirconium dichloride,
bis(dimethylcyclopentadienyl)zirconium dibromide,
bis(dimethylcyclopentadienyl)zirconium methoxychloride,
bis(dimethylcyclopentadienyl)zirconium ethoxychloride,
bis(dimethylcyclopentadienyl)zirconium butoxychloride,
bis(dimethylcyclopentadienyl)zirconium diethoxide,
bis(dimethylcyclopentadienyl)zirconium methylchloride,
bis(dimethylcyclopentadienyl)zirconium dimethyl,
bis(dimethylcyclopentadienyl)zirconium benzylchloride,
bis(dimethylcyclopentadienyl)zirconium dibenzyl,
bis(dimethylcyclopentadienyl)zirconium phenylchloride, and
bis(dimethylcyclopentadienyl)zirconium hydride chloride.

In the above examples, the di-substituted cyclopentadienyl rings include 1,2- and 1,3-substituted cyclopentadienyl rings. In the present invention, transition metal compounds wherein a zirconium metal is replaced with a titanium metal or a hafnium metal in the above-mentioned zirconium compounds are also employable.

Of the above transition metal compounds represented by the formula (I), particularly preferable are:
bis(n-propylcyclopentadienyl)zirconium dichloride,
bis(n-butylcyclopentadienyl)zirconium dichloride,
bis(1-methyl-3-n-propylcyclopentadienyl)zirconium dichloride,
bis)1-methyl-3-n-butylcyclopentadienyl)zirconium dichloride,
bis(1,3-dimethylcyclopentadienyl)zirconium dichloride,
bis(1,3-diethylcyclopentadienyl)zirconium dichloride, and
bis)1-methyl-3-ethylcyclopentadienyl)zirconium dichloride.

(b) Organoaluminum oxy-compound

The organoaluminum oxy-compound (b) is described below.

The organoaluminum oxy-compound (b) (sometimes referred to as a "component (b)" hereinafter) for use in the invention may be benzene-soluble aluminoxane hitherto known or such a benzene-insoluble organoaluminum oxy-compound as disclosed in Japanese Patent Laid-Open Publication No. 276807/1990.

The aluminoxane can be prepared by, for example, the following processes.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization, and the aluminoxane is recovered as a hydrocarbon solution.

(2) Water, ice or water vapor is allowed to directly act on an organoaluminum compound such as trialkylaluminum in a medium such as benzene, toluene, ethyl ether or tetrahydrofuran, and the aluminoxane is recovered as a hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. It is possible that the solvent or the unreacted organoaluminum compound is distilled off from the recovered solution of aluminoxane and the remainder is redissolved in a solvent.

Examples of the organoaluminum compounds used for preparing the aluminoxane include:
trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;
tricycloalkylaluminums, such as tricyclohexylaluminum and tricyclooctylaluminum;
dialkylaluminum halides, such as dimethylaluminum chloride, diethylaluminum chloride, diethylaluminum bromide and diisobutylaluminum chloride;
dialkylaluminum hydrides, such as diethylaluminum hydride and diisobutylaluminum hydride;
dialkylaluminum alkoxides, such as dimethylaluminum methoxide and diethylaluminum ethoxide; and dialkylaluminum aryloxides, such as diethylaluminum phenoxide.

Of these, trialkylaluminums and trialkylaluminums are particularly preferable.

Also employable as the organoaluminum compound is isoprenylaluminum represented by the following formula:

$$(i\text{-}C_4H_9)_xAl_y(C_5H_{10})_z$$

wherein x, y, z are each a positive number, and $z \geq 2x$.

The organoaluminum compounds mentioned above are used singly or in combination.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, particularly chlorinated or brominated products thereof. Also employable are ethers such as ethyl ether and tetrahydrofuran. Of the solvents, aromatic hydrocarbons are particularly preferable.

The benzene-insoluble organoaluminum oxy-compound contains not more than 10% (in terms of Al atom), preferably not more than 5%, particularly preferably not more than 2%, of an Al component that is soluble in benzene at 60° C., and is insoluble or sparingly soluble in benzene.

The solubility of the organoaluminum oxy-compound in benzene can be determined in the following manner. The organoaluminum oxy-compound in an amount corresponding to 100 mg·atom of Al is suspended in 100 ml of benzene, and they are mixed a 60° C. for 6 hours with stirring. Then, the mixture is subjected to hot filtration at 60° C. using a jacketed G-5 glass filter, and the solid separated on the filter is washed four times with 50 ml of benzene at 60° C. to obtain filtrates. The amount (xmmol) of Al atom present in all of the filtrates is measured to determine the solubility (x%)

Carrier (c)

The carrier (c) for use in the invention is an inorganic or organic compound of granular or particulate solid having a particle diameter of 10 to 300 μm, preferably 20 to 200 μm. The inorganic carrier is preferably a porous oxide, and examples thereof include $SiO_2$, $Al_2O_3$, MgO, $ZrO_2$, $TiO_2$, $B_2O_3$, CaO, ZnO, BaO, $ThO_2$, and mixtures thereof such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are oxides containing at least one component selected from the group consisting of $SiO_2$ and $Al_2O_3$ as their major component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the carriers (c) differ in the properties depending upon the type and the preparation process, the carrier preferably used in the invention is desired to have a specific surface area of 50 to 1000 m²/g, preferably 100 to 700 m²/g, and a pore volume of 0.3 to 2.5 cm²/g. The carrier is used after calcined at a temperature of 100 to 1000° C., preferably 150 to 700° C., if necessary.

Also employable as the carrier in the invention is an organic compound of granular or particulate solid having a particle diameter of 10 to 300 μm. Examples of such organic compounds include (co)polymers produced using an α-olefin of 2 to 14 carbon atoms such as ethylene, propylene, 1-butene or 4-methyl-1-pentene as a main component, and (co)polymers produced using vinylcyclohexane or styrene as a main component.

In the present invention, the olefin polymerization catalyst used for preparing the ethylene/α-olefin copolymer is formed from the component (a), the component (b) and the carrier (c), but an organoaluminum compound (d) may also be used, if necessary.

(d) Organoaluminum Compound

The organoaluminum compound (d) (sometimes referred to as a "component (d)" hereinafter) that is optionally used is, for example, an organoaluminum compound represented by the following formula (III):

$$R^1{}_nAlX_{3-n} \tag{III}$$

wherein $R^1$ is a hydrocarbon group of 1 to 12 carbon atoms, X is a halogen atom or a hydrogen atom, and n is 1 to 3.

In the formula (III), $R^1$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound (d) is a compound represented by the following formula (IV):

$$R^1{}_nAlY_{3-n} \tag{IV}$$

wherein $R^1$ is the same hydrocarbon as indicated by $R^1$ in the formula (III); Y is —$OR^2$ group, —$OSiR^3{}_3$ group, —$OAlR^4{}_2$ group, —$NR^5{}_2$ group, —$SiR^6{}_3$ group or —$N(R^7)AlR^8{}_2$ group; n is 1 to 2; $R^2$, $R^3$, $R^4$ and $R^8$ are each methyl, ethyl, isopropyl, isobutyl, cyclohexyl, phenyl or the like; $R^5$ is hydrogen, methyl, ethyl, isopropyl, phenyl, trimethylsilyl or the like; and $R^6$ and $R^7$ are each methyl, ethyl or the like.

Examples of such organoaluminum compounds include:

(1) compounds represented by $R^1{}_nAl(OR^2)_{3-n}$, such as dimethylaluminum methoxide, diethylaluminum ethoxide and diisobutylalum-num methoxide;

(2) compounds represented by $R^1{}_nAl(OSiR^3{}_3)_{3-n}$, such as $Et_2Al(OSiMe_3)$, $(iso\text{-}Bu)_2Al(OSiMe_3)$ and $(iso\text{-}Bu)_2Al(OSiEt_3)$;

(3) compounds represented by $R^1{}_nAl(OAlR^4{}_2)_{3-n}$, such as $Et_2AlOAlEt_2$ and $(iso\text{-}Bu)_2AlOAl(iso\text{-}Bu)_2$;

(4) compounds represented by $R^1{}_nAl(NR^5{}_2)_{3-n}$, such as $Me_2AlNEt_2$, $Et_2AlNHMe$, $Me_2AlNHEt$, $Et_2AlN(SiMe_3)_2$ and $(iso\text{-}Bu)_2AlN(SiMe_3)_2$;

(5) compounds represented by $R^1{}_nAl(SiR^6{}_3)_{3-n}$, such as $(iso\text{-}Bu)_2AlSiMe_3$; and (6) compounds represented by $R^1{}_nAl(N(R^7)AlR^8{}_2)_{3-n}$, such as $Et_2AlN(Me)AlEt_2$ and $(iso\text{-}Bu)_2AlN(Et)Al(iso\text{-}Bu)_2$.

Of the organoaluminum compounds represented by the formulas (III) and (IV), preferable are compounds represented by the formulas $R^1{}_3Al$, $R^1{}_nAl(OR^2)_{3-n}$ and $R^1{}_nAl(OAlR^4{}_2)_{3-n}$, and particularly preferable are compounds of said formulas wherein $R^1$ is an isoalkyl group and n is 2.

Process for the Preparation of Catalyst n the preparation of the ethylene/α-olefin copolymer for use in the invention, a catalyst prepared by contacting the component (a), the component (b), the carrier (c), and if necessary, the component (d) with one another is employed. Although the components may be contacted in any order, it is preferable to contact the carrier (c) with the component (b), then with the component (a), and then if necessary, with the component (d).

The contact of the components can be carried out in an inert hydrocarbon solvent. Examples of the inert hydrocarbon media used for preparing the catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons.

In the contact of the component (a), the component (b), the carrier (c) and the component (d) optionally used, the component (a) is used in an amount of usually $5 \times 10^{-6}$ to $5 \times 10^{-4}$ mol, preferably $10^{-5}$ to $2 \times 10^{-4}$ mol, based on 1 g of the carrier (c), and the concentration of the component (a) is in the range of about $10^{-4}$ to $2 \times 10^{-2}$ mol/l, preferably $2 \times 10^{-4}$ to $10^{-2}$ mol/l. The atomic ratio (Al/transition metal) of aluminum in the component (b) to the transition metal in the component (a) is in the range of usually 10 to 500, preferably 20 to 200. The atomic ratio ((Al-d)/(Al-b)) of an aluminum atom (Al-d) in the component (d) optionally used to an aluminum atom (Al-b) in the component (b) is in the range of usually 0.02 to 3, preferably 0.05 to 1.5. In the contact of the component (a), the component (b), the carrier (c) and the component (d) optionally used, the mixing temperature is in the range of usually −50 to 150° C., preferably −20 to 120° C., and the contact time is in the range of 1 minute to 50 hours, preferably 10 minutes to 25 hours.

In the olefin polymerization catalyst obtained as above, the transition metal atom derived from the component (a) is desirably supported in an amount of $5 \times 10^{-6}$ to $5 \times 10^{-4}$ g·atom, preferably $10^{-5}$ to $2 \times 10^{-4}$ g·atom, based on 1 g of the carrier (c), and the aluminum atom derived from the component (b) and the component (d) is desirably supported in an amount of $10^{-3}$ to $5 \times 10^{-2}$ g·atom, preferably $2 \times 10^{-3}$ to $2 \times 10^{-2}$ g·atom, based on 1 g of the carrier (c).

The catalyst used for preparing the ethylene/α-olefin copolymer may be a prepolymerized catalyst obtained by prepolymerizing an olefin in the presence of the component (a), the component (b), the carrier (c) and the component (d) optionally used. The prepolymerization can be carried out by introducing an olefin into an inert hydrocarbon solvent in the presence of the component (a), the component (b), the carrier (c) and the component (d) optionally used.

Examples of the olefins used in the prepolymerization include ethylene and α-olefins of 3 to 20 carbon atoms, such as propylene, 1-butene, 1-pentene, 4-methyl-1-pentene, 1-hexene, 1-octene, 1-decene, 1-dodecene and 1-tetradecene. Of these, particularly preferable is ethylene or a combination of ethylene and an α-olefin, that is used in the polymerization.

In the prepolymerization, the component (a) is used in an amount of usually $10^{-6}$ to $2 \times 10^{-2}$ mol/l, preferably $5 \times 10^{-5}$ to $10^{-2}$ mol/l, and the component (a) is used in an amount of usually $5 \times 10^{-6}$ to $5 \times 10^{-4}$ mol, preferably $10^{-5}$ to $2 \times 10^{-4}$ mol, based on 1 g of the carrier (c). The atomic ratio (Al/transition metal) of aluminum in the component (b) to the transition metal in the component (a) is in the range of usually 10 to 500, preferably 20 to 200. The atomic ratio ((Al-d)/(Al-b)) of an aluminum atom (Al-d) in the component (d) optionally used to an aluminum atom (Al-b) in the component (b) is in the range of usually 0.02 to 3, preferably 0.05 to 1.5. The prepolymerization temperature is in the range of −20 to 80° C., preferably 0 to 60° C., and the prepolymerization time is in the range of 0.5 to 100 hours, preferably about 1 to 50 hours.

The prepolymerized catalyst is prepared by, for example, the following process. The carrier (c) is suspended in an inert hydrocarbon to give a suspension. To the suspension, the organoaluminum oxy-compound (component (b)) is added, and they are reacted for a given period of time. Then, the supernatant liquid is removed, and the resulting solid component is resuspended in an inert hydrocarbon. To the system, the transition metal compound (component (a)) is added, and the reaction is conducted for a given period of time. Then, the supernatant liquid is removed to obtain a solid catalyst component. Subsequently, to an inert hydrocarbon containing the organoaluminum compound (component (d)), the above-obtained solid catalyst component is added and an olefin is further introduced, whereby a prepolymerized catalyst is obtained.

It is desirable that the amount of an olefin polymer produced in the prepolymerization is in the range of 0.1 to 500 g, preferably 0.2 to 300 g, more preferably 0.5 to 200 g, based on 1 g of the carrier (c). In the prepolymerized catalyst, the component (a) is desirably supported in an amount of about $5 \times 10^{-6}$ to $5 \times 10^{-4}$ g·atom, preferably $10^{-5}$ to $2 \times 10^{-4}$ g·atom, in terms of the transition metal atom, based on 1 g of the carrier (c), and the aluminum atom (Al) derived from the component (b) and the component (d) is desirably supported in such an amount that the molar ratio (Al/M) of the aluminum atom (Al) to the transition metal atom (M) derived from the component (a) becomes 5 to 200, preferably 10 to 150.

The prepolymerization can be carried out by any of batchwise and continuous processes, and can be carried out under reduced pressure, at atmospheric pressure or under pressure. In the prepolymerization, it is desirable to produce a prepolymer having an intrinsic viscosity (η), as measured in decalin at 135° C., of 0.2 to 7 dl/g, preferably 0.5 to 5 dl/g, by allowing hydrogen to be present in the system.

The ethylene/α-olefin copolymer for use in the invention is obtained by copolymerizing ethylene and an α-olefin of 3 to 20 carbon atoms, such as propylene, 1-butene, 1-pentene, 1-hexene, 4-methyl-1-pentene, 1-octene, 1-decene, 1-dodecene, 1-tetradecene, 1-hexadecene, 1-octadecene or 1-eicosene, in the presence of the olefin polymerization catalyst or the prepolymerized catalyst described above.

Polymerization Process

In the present invention, the copolymerization of ethylene and an α-olefin is carried out in a gas phase or a liquid phase of slurry. In the slurry polymerization, an inert hydrocarbon may be used as a solvent, or the olefin itself may be used as a solvent.

Examples of the inert hydrocarbon solvents used in the slurry polymerization include aliphatic hydrocarbons, such as butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of the inert hydrocarbon media, preferable are aliphatic hydrocarbons, alicyclic hydrocarbons and petroleum fractions.

When the copolymerization is carried out as slurry polymerization or gas phase polymerization, the olefin polymerization catalyst or the prepolymerized catalyst is desirably used in an amount of usually $10^{-8}$ to $10^{-3}$ g·atom/l, preferably $10^{-7}$ to $10^{-4}$ g·atom/l, in terms of a concentration of the transition metal atom in the polymerization reaction system.

In the polymerization, an organoaluminum oxy-compound similar to the component (b) and/or the organoaluminum compound (d) may be added. In this case, the atomic ratio (Al/M) of an aluminum atom (Al) derived from the organoaluminum oxy-compound and the organoaluminum compound to the transition metal atom (M) derived from the transition metal compound (a) is in the range of 5 to 300, preferably 10 to 200, more preferably 15 to 150.

When the slurry polymerization is conducted, the polymerization temperature is in the range of usually −50 to 100° C., preferably 0 to 90° C. When the gas phase polymerization is conducted, the polymerization temperature is in the range of usually 0 to 120° C., preferably 20 to 100° C.

The polymerization pressure is in the range of usually atmospheric pressure to 100 kg/cm$^2$, preferably 2 to 50 kg/cm$^2$. The polymerization can be carried out by any of batchwise, semi-continuous and continuous processes.

It is possible to conduct polymerization in two or more stages under different reaction conditions.

Process for the Production of Foamed Product

The ethylene resin foamed product according to the invention is produced by mixing the ethylene/α-olefin copolymer with a blowing agent, heating the mixture or reducing the pressure and thereby gasifying the blowing agent or generating a decomposition gas to produce cells in the resin molded product.

Examples of the processes for producing the ethylene resin foamed product of the invention include the following ones.

(1) Extrusion Foaming Process

The ethylene/α-olefin copolymer is fed to a hopper of an extruder. When the copolymer is extruded at a temperature in the vicinity of a melting point of the resin, a physical blowing agent is forced into the extruder through a forcing hole provided midway in the extruder and the resin is extruded from an extruder die of desired shape, whereby a foamed product can be continuously obtained. Examples of the physical blowing agents include volatile blowing agents, such as flon, butane, pentane, hexane and cyclohexane; and inorganic gas type blowing agents, such as nitrogen, air, water and carbonic acid gas. In the extrusion foaming, a cell nucleating agent such as calcium carbonate, talc, clay or magnesium oxide may be added.

The physical blowing agent is used in an amount of usually 5 to 60 parts by weight, preferably 10 to 50 parts by weight, based on 100 parts by weight of the specific ethylene/α-olefin copolymer. If the amount of the physical blowing agent is too small, the foam properties of the foamed product are lowered. On the other hand, if the amount thereof is too large, the strength of the foamed product is lowered.

(2) Foaming Process Using Thermal Decomposition Type Blowing Agent

The ethylene/α-olefin copolymer, a thermal decomposition type organic blowing agent such as azodicarbonamide, and if desired, other additives and a thermoplastic resin are melt kneaded by a kneading device, such as uniaxial extruder, twin-screw extruder, Banbury mixer, kneader mixer or roll, at a temperature lower than the decomposition temperature of the thermal decomposition type blowing agent, to prepare a foaming resin composition, and the resin composition is generally molded into a sheet. Then, the sheet is heated to a temperature of not lower than the decomposition temperature of the blowing agent, whereby a foamed product can be obtained.

The thermal decomposition type organic blowing agent is used in an amount of usually 1 to 50 parts by weight, preferably 4 to 25 parts by weight, based on 100 parts by weight of the specific ethylene/α-olefin copolymer. If the amount of the thermal decomposition type organic blowing agent is too small, the foam properties of the foamed product are lowered. On the other hand, if the amount thereof is too large, the strength of the foamed product is lowered.

(3) Foaming Process Using Pressure Vessel

The ethylene/α-olefin copolymer is molded into a sheet or a block by means of a pressing machine or an extruder. Then, the molded product is placed in a pressure vessel, and a physical blowing agent is sufficiently dissolved in the resin. Then, the pressure is reduced, whereby a foamed product can be produced. It is also possible that a pressure vessel in which the molded product has been placed is filled with a physical blowing agent at ordinary room temperature, then the pressure in the vessel is increased and then reduced, and the molded product is taken out of the vessel and heated in an oil bath, an oven or the like to foam the molded product.

If the ethylene/α-olefin copolymer is previously crosslinked, an ethylene resin foamed product comprising crosslinked polyethylene can be obtained.

Examples of general crosslinking methods include crosslinking by thermal decomposition of a peroxide radical initiator having been mixed with the resin, crosslinking by irradiation with ionizing radiation, crosslinking by irradiation with ionizing radiation in the presence of a polyfunctional monomer and silane crosslinking.

In order to obtain a crosslinked foamed product through such methods, the ethylene/α-olefin copolymer, a thermal decomposition type organic blowing agent, a polyfunctional monomer as a crosslinking assistant and other additives are melt kneaded at a temperature lower than the decomposition temperature of the thermal decomposition type blowing agent and molded into a sheet. The foaming resin composition sheet thus obtained is irradiated with ionizing radiation in a prescribed dose to crosslink the ethylene/α-olefin copolymer. Then, the crosslinked sheet is heated to a temperature of not lower than the decomposition temperature of the blowing agent to foam the sheet. Examples of the ionizing radiation include α-rays, β-rays, γ-rays and electron rays. Instead of the crosslinking by irradiation with ionizing radiation, peroxide crosslinking or silane crosslinking can be carried out.

In the present invention, additives, such as weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, may be optionally added to the ethylene/α-olefin copolymer in amounts not detrimental to the object of the present invention. Further, other polymer compounds can be blended in small amounts without departing from the spirit of the present invention.

EFFECT OF THE INVENTION

According to the present invention, a foamed product comprising an ethylene/α-olefin copolymer and having excellent flexibility, toughness and formability can be provided. The uncrosslinked foamed product is excellent also in recycling properties.

EXAMPLE

The present invention is further described with reference to the following examples, but it should be construed that the invention is in no way limited to those examples.

In the examples and the comparative examples, properties of the foamed products were evaluated in the following manner.

(1) Granulation of Ethylene/α-olefin Copolymer

To 100 parts by weight of an ethylene/α-olefin copolymer powder obtained by gas phase polymerization, 0.05 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat stabilizer and 0.05 part by weight of calcium stearate as a hydrochloric acid absorbent were added. Then, the mixture was melt extruded by a conical tapered twin-screw extruder manufactured by Haake Co. at a preset temperature of 180° C. to prepare granulation pellets.

(2) Density

Strands obtained in the measurement of melt flow rate (MFR) at 190° C. under a load of 2.16 kg were heat treated at 120° C. for 1 hour and then slowly cooled to room temperature over a period of 1 hour. Then, the density was measured by a density gradient tube.

(3) Composition of Copolymer

Composition of a copolymer was determined by $^{13}C$-NMR. That is, in a test Lube having a diameter of 10 mm, a copolymer powder of about 200 mg was homogeneously dissolved in 1 ml of hexachlorobutadiene to give a sample, and a $^{13}C$-NMR spectrum of the sample was measured under the conditions of a measuring temperature of 120° C., a measuring frequency of 25.05 MHz, a spectral width of 1500 Hz, a pulse repetition time of 4.2 sec and a pulse width of 6 $\mu$sec, to determine composition of the copolymer.

(4) Melt Flow Fate (MFR)

Using granulation pellets of a copolymer, the melt flow rate was measured in accordance with ASTM D1238-65T under the conditions of a temperature of 190° C. and a load of 2.16 kg.

(5) Molecular Weight Distribution (Mw/Mn)

The molecular weight distribution was measured by Waters GPC Model ALC-GPC-150C. The measurement was carried out at a temperature of 140° C. using a column of PSK-GMH-HT manufactured by Toyo Soda K.K. and using a solvent of orthodichlorobenzene (ODCB).

(6) Maximum Peak Temperature (Tm) Measured by DSC

The temperature (Tm) at the maximum peak position in the endothermic curve was determined in the following manner using an apparatus of DSC-7 Model manufactured by Perkin Elmer Co. A sample of about 5 mg was placed in an aluminum pan, heated up to 200° C. at a rate or 10° C./min, held at 200° C. for 5 minutes, cooled to room temperature at a rate of 10° C./min and then heated at a rate of 10° C./min to give an endothermic curve, from which the temperature at the maximum peak position was found.

(7) n-Decane-soluble Component Fraction (W)

The amount of a n-decane-soluble component in an ethylene/α-olefin copolymer was measured by a method comprising adding about 3 g of the copolymer to 450 ml of n-decane, dissolving the copolymer at 145° C., cooling the resulting solution to 23° C., removing a n-decane-insoluble component by filtration and recovering a n-decane-soluble component from the filtrate.

The n-decane-soluble component fraction is defined as follows.

W (%)=Weight of n-decane-soluble component/(Weight of n-decane-insoluble and soluble components)×100

(8) Melt Tension (MT)

The melt tension was determined by measuring a stress given when a molten polymer was drawn at a constant rate. That is, granulation pellets of a copolymer were used as test samples, and the measurement was carried out using a MT measuring device manufactured by Toyo Seiki Seisakusho under the conditions of a resin temperature of 190° C., an extrusion temperature of 15 mm/min, a take-up rate of 10 to 20 m/min, a nozzle diameter of 2.09 mm and a nozzle length of 8 mm.

(9) Flow Index (FI)

The flow index (FI) is defined as a shear rate at which the shear stress reaches $2.4 \times 10^6$ dyne/cm$^2$ at 190° C. The flow index (FI) was determined by extruding a resin from a capillary with changing a shear rate and measuring a stress at each shear rate. That is, the measurement was carried out using the same sample as in the MT measurement and using a capillary type property tester manufactured by Toyo Seiki Seisakusho under the conditions of a resin temperature of 190° C. and a shear stress range of about $5 \times 10^4$ to $3 \times 10^6$ dyne/cm$^2$.

In this measurement, the diameter of a nozzle (capillary) was changed as follows according to the MFR (g/10 min) of the resin to be measured.

MFR>20: 0.5 mm

20≧MFR>3: 1.0 mm

3≧MFR>0.8: 2.0 mm 0.8≧MFR: 3.0 mm

(10) Temperature Rise Elution Properties (TREF)

A sample solution was introduced into a column at 140° C., then cooled to 25° C. at a cooling rate of 10° C./hr and heated at a heating rate of 15° C./hr to detect, on the online system, components having been continuously eluted at a constant flow rate of 1.0 ml.

This test was carried out using a column of 2.14 cm (diameter)×15 cm, glass beads having a diameter of 100 $\mu$m as packing and orthodichlorobenzene as a solvent under the test conditions of a sample concentration of 200 mg/40 ml-orthodichlorobenzene and a pour of 7.5 ml.

(11) Heat Resistance

A foamed sheet was cut into a size of 50×50 mm, and thereto was applied a load of 80 g/cm$^2$ at 80° C. to measure a thickness $T_0$ of the sheet immediately after application of the load and a thickness $T_{10}$ of the sheet after a lapse of 10 hours. The $T_{10}/T_0$ ratio was taken as an indication of heat resistance.

As the $T_{10}/T_0$ ratio comes close to 1.0, the heat resistance becomes better.

(12) Tensile Test

The tensile strength at break in the direction of extrusion of a sheet was measured in accordance with JIS K-6767.

Preparation Example 1

Preparation of Ethylene/α-olefin Copolymer (A-1)

Preparation of Catalyst

In 154 liters of toluene, 10 kg of silica having been dried at 250° C. for 10 hours was suspended, and the suspension was cooled to 0° C. Thereafter, 57.5 liters of a toluene solution of methylaluminoxane (Al=1.33 mol/l) was dropwise added over a period of 1 hour. During the addition, the temperature of the system was maintained at 0° C. The reaction was successively conducted at 0° C. for 30 minutes. Then, the temperature of the system was raised up to 95° C. over a period of 1.5 hours, and at that temperature, the reaction was conducted for 20 hours. Thereafter, the temperature of the system was lowered to 60° C., and the supernatant liquid was removed by decantation. The resulting solid component was washed twice with toluene and then resuspended in 100 liters of toluene. To the system, 16.8 liters of a toluene solution of bis(1,3-dimethylcyclopentadienyl)zirconium dichloride (Zr=27.0 mmol/l) was dropwise added at 80° C. over a period of 30 minutes, and the reaction was further conducted at 80° C. for 2 hours. Then, the supernatant liquid was removed, and the remainder was washed twice with hexane to obtain a solid catalyst containing zirconium in an amount of 3.5 mg per gram of the solid catalyst.

Preparation of Prepolymerized Catalyst

To 87 liters of hexane containing 2.5 mol of triisobutylaluminum, 870 g of the above-obtained solid catalyst and 260 g of 1-hexene were added, and prepolymerization of ethylene was conducted at 35° C. for 5 hours to obtain a prepolymerized catalyst wherein an ethylene polymer had been produced by prepolymerization in an amount of 10 g per gram of the solid catalyst.

Polymerization

In a continuous type fluidized bed gas phase polymerization apparatus, copolymerization of ethylene and 1-hexene was conducted at a polymerization temperature of 80° C. under a total pressure of 20 kg/cm²-G. To the system were continuously fed the above-obtained prepolymerized catalyst at a rate of 0.33 mmol/hr in terms of a zirconium atom and triisobutylaluminum at a rate of 10 mmol/hr. During the polymerization, ethylene, 1-hexene, hydrogen and nitrogen were continuously fed to maintain the gas composition constant (gas composition: 1-hexene/ethylene=0.038, hydrogen/ethylene=16×10$^{-4}$, ethylene concentration=70%)

The yield of the resulting ethylene/α-olefin copolymer (A-1) was 60 kg/hr, the density of the copolymer was 0.915 g/cm³, MFR thereof was 3.5 g/10 min, and the amount of the decane-soluble component at room temperature was 0.48% by weight. The properties of the ethylene/α-olefin copolymer (A-1) are set forth in Table 1.

Example 1

To 100 parts by weight of the ethylene/α-olefin copolymer (A-1), 20 parts by weight of butane and 1 part by weight of talc were added, and they were melt kneaded and then extrusion foamed by an extruder to prepare a foamed sheet having a thickness of 1 mm. The foamed sheet was evaluated on TREF, cell uniformity and heat resistance. The results are set forth in Table 2.

Preparation Example 2

Preparation of Ethylene/o-olefin Copolymer Composition (B-1)

An ethylene/α-olefin copolymer (a-4) (density: 0.915 g/cm³) and an ethylene/α-olefin copolymer (b-4) (density: 0.933 g/cm³) were each prepared in the same manner as in Preparation Example 1, except that a titanium catalyst component described in Japanese Patent Publication No. 54289/1988 was used instead of bis(1,3-dimethylcyclopentadienyl)zirconium dichloride, triethylaluminum was used instead of methylaluminoxane, and the gas composition ratio was changed as shown in Table 1. The ethylene/α-olefin copolymers (a-4) and (b-4) were melt kneaded in a weight ratio of 60/40 ((a-4)/(b-4)) to obtain an ethylene/α-olefin copolymer composition (B-1). The properties of the ethylene/α-olefin copolymer composition (B-1) are set forth in Table 1.

Comparative Example 1

To 100 parts by weight of the ethylene/α-olefin copolymer composition (B-1), 20 parts by weight of butane and 1 part by weight of talc were added, and they were melt kneaded and then extrusion foamed by an extruder to prepare a foamed sheet having a thickness of 1 mm. The foamed sheet was evaluated on TREF, cell uniformity and tensile strength. The results are set forth in Table 2.

Comparative Example 2

To 100 parts by weight of a polymer (B-2) (EXACT 3029, available from Exxon Chemical Co., MFR: 3.9 g/10 min, density: 0.915 g/cm³), 20 parts by weight of butane and 1 part by weight of talc were added, and they were melt kneaded and then extrusion foamed by an extruder to prepare a foamed sheet having a thickness of 1 mm. The foamed sheet was evaluated on TREF, cell uniformity and heat resistance. The results are set forth in Table 2.

Preparation Example 3

Preparation of Ethylene/α-olefin Copolymer (A-2)

An ethylene/α-olefin copolymer (A-2) was prepared in the same manner as in Preparation Example 1, except that the reaction conditions were controlled so as to obtain a copolymer having MFR and a density shown in Table 1.

Example 3

To 100 parts by weight of the ethylene/α-olefin copolymer (A-2), 20 parts by weight of butane and 1 part by weight of talc were added, and they were melt kneaded and then extrusion foamed by an extruder to prepare a foamed sheet having a thickness of 1 mm. The foamed sheet was evaluated on TREF and cell uniformity. The results are set forth in Table 2.

Preparation Example 4

Preparation of Ethylene/α-olefin Copolymer (A-3)

An ethylene/α-olefin copolymer (A-3) was obtained in the same manner as in Preparation Example 1, except that the reaction conditions were controlled so as to obtain a copolymer having MFR and a density shown in Table 1.

Example 2

To 100 parts by weight of the ethylene/α-olefin copolymer (A-3), 20 parts by weight of butane and 1 part by weight of talc were added, and they were melt kneaded and then extrusion foamed by an extruder to prepare a foamed sheet having a thickness of 1 mm. The foamed sheet was evaluated on TREF and cell uniformity. The results are set forth in Table 2.

Preparation Example 5

Preparation of Ethylene/α-olefin Copolymer (A-4)

Preparation of Catalyst

A polymerization catalyst was obtained in the same manner as in the preparation of catalyst component in Preparation Example 1, except that 2.9 liters of a toluene solution of bis(1,3-dimethylcyclopentadienyl)zirconium dichloride (Zr: 28.1 mmol/l) and 10.9 liters of a toluene solution of bis(1,3-n-butylmethylcyclopentadienyl) zirconium dichloride (Zr: 34.0 mmol/l) were used instead of 16.8 liters of the toluene solution of bis(1,3-dimethylcyclopentadienyl)zirconium dichloride.

Polymerization

An ethylene/α-olefin copolymer (A-4) was obtained in the same manner as in Preparation Example 1, except that the above-obtained polymerization catalyst was used so as to obtain a copolymer having a density and MFR shown in Table 1.

The properties of the ethylene/α-olefin copolymer (A-4) are set forth in Table 1.

Example 4

To 100 parts by weight of the ethylene/α-olefin copolymer (A-4), 20 parts by weight of butane and 1 part by weight of talc were added, and they were melt kneaded and then extrusion foamed by an extruder to prepare a foamed sheet having a thickness of 1 mm. The foamed sheet was evaluated on TREF and cell uniformity. The results are set forth in Table 2.

Preparation Example 6

Preparation of Ethylene/α-olefin copolymer (A-5)

Preparation of Catalyst

A polymerization catalyst was obtained in the same manner as in the preparation of catalyst component in Preparation Example 1, except that ethylenebis(indenyl) zirconium dichloride was used instead of bis(1,3-dimethylcyclopentadienyl)zirconium dichloride.

Polymerization

An ethylene/α-olefin copolymer (A-5) was obtained in the same manner as in Preparation Example 1, except that the above-obtained polymerization catalyst was used so as to obtain a copolymer having a density and MFR shown in Table 1. The properties of the ethylene/α-olefin copolymer (A-5) are set forth in Table 1.

Example 5

To 100 parts by weight of the ethylene/α-olefin copolymer (A-5), 20 parts by weight of butane and 1 part by weight of talc were added, and they were melt kneaded and then extrusion foamed by an extruder to prepare a foamed sheet having a thickness of 1 mm. The foamed sheet was evaluated on TREF and cell uniformity. The results are set forth in Table 2.

Example 6

To 100 parts by weight of the ethylene/α-olefin copolymer (A-1), 10 parts by weight of azodicarbonamide (decomposition type blowing agent) was added, and they were melt kneaded and then extruded by an extruder to obtain a sheet. The sheet was irradiated with electron rays of 4 Mrad to prepare a crosslinked sheet. The crosslinked sheet was heated to 230° C. to prepare a foamed sheet. The foamed sheet was evaluated on TREF and cell uniformity. The results are set forth in Table 2.

Preparation Example 7

Preparation of Ethylene/α-olefin Copolymer (A-6)

Preparation of Catalyst

A polymerization catalyst was obtained in the same manner as in the preparation of catalyst component in Preparation Example 1, except that bis)1-methyl-3-n-butylcyclopentadienyl)zirconium dichloride was used instead of bis(1,3-dimethylcyclopentadienyl)zirconium dichloride.

Polymerization

An ethylene/α-olefin copolymer (A-6) was obtained in the same manner as in Preparation Example 1, except that the above-obtained polymerization catalyst was used so as to obtain a copolymer having a density and MFR shown in Table 1 and the gas composition was changed so as to give a 1-hexene/ethylene ratio of 0.02, a hydrogen/ethylene ratio of $4.6 \times 10^{-4}$ and an ethylene concentration of 70%. The properties of the ethylene/α-olefin copolymer (A-6) are set forth in Table 1.

Example 7

To 100 parts by weight of the ethylene/α-olefin copolymer (A-6), 20 parts by weight of butane and 1 part by weight of talc were added, and they were melt kneaded and then extrusion foamed by an extruder to prepare a foamed sheet having a thickness of 1 mm. The foamed sheet was evaluated on TREF, cell uniformity, heat resistance and tensile strength. The results are set forth in Table 2.

Preparation Example 8

Preparation of Ethylene/α-olefin Copolymer (A-7)

An ethylene/α-olefin copolymer (A-7) was obtained in the same manner as in Preparation Example 4, except that the reaction conditions were controlled so as to obtain a copolymer having MFR and a density shown in Table 3. The properties of the ethylene/α-olefin copolymer (A-7) are set forth in Table 1.

Example 8

To 100 parts by weight of the ethylene/α-olefin copolymer (A-7), 20 parts by weight of butane and 1 part by weight of talc were added, and they were melt kneaded and then extrusion foamed by an extruder to prepare a foamed sheet having a thickness of 1 mm. The foamed sheet was evaluated on TREF and cell uniformity. The results are set forth in Table 2.

Preparation Example 9

Preparation of Ethylene/α-olefin Copolymer (A-8)

An ethylene/α-olefin copolymer (A-8) was obtained in the same manner as in Preparation Example 4, except that the reaction conditions were controlled so as to obtain a copolymer having MER and a density shown in Table 3. The properties of the ethylene/α-olefin copolymer (A-8) are set forth in Table 1.

TABLE 1

| Co-polymer | Comonomer Type | Content mol % | MFR g/10 min | Mw/Mn | Density g/cm³ | n-decane soluble part wt % | *1 | TM ° C. | *2 | MT g | *3 | FI S⁻¹ | *4 |
|---|---|---|---|---|---|---|---|---|---|---|---|---|---|
| A-1 | 1-hexene | 4.0 | 3.5 | 2.8 | 0.915 | 0.48 | 2.52 | 114.2 | 116.0 | 1.0 | 0.77 | 570 | 260 |
| A-2 | 1-hexene | 2.5 | 1.5 | 2.9 | 0.923 | 0.41 | 1.19 | 115.8 | 119.2 | 2.3 | 1.56 | 280 | 110 |
| A-3 | 1-hexene | 5.1 | 1.4 | 2.8 | 0.905 | 2.05 | 6.67 | 110.7 | 112.0 | 2.6 | 1.66 | 270 | 110 |
| B-1 | 1-hexene | 4.8 | 4.2 | 4.8 | 0.918 | 8.9 | 1.89 | 122.6 | 117.2 | 0.44 | 0.66 | 510 | 320 |
| B-2 | 1-hexene | 3.5 | 3.9 | 2.0 | 0.915 | 0.31 | 2.52 | 107.7 | 116.0 | 0.44 | 0.70 | 220 | 290 |
| A-4 | 1-hexene | 2.5 | 1.7 | 2.6 | 0.922 | 0.43 | 1.30 | 116.0 | 118.8 | 2.3 | 1.41 | 200 | 130 |
| A-5 | 1-hexene | 3.0 | 1.5 | 4.4 | 0.920 | 0.44 | 1.57 | 114.8 | 118.0 | 5.0 | 1.56 | 520 | 110 |
| A-6 | 1-hexene | 4.1 | 4.0 | 2.1 | 0.915 | 0.50 | 2.52 | 113.9 | 116.0 | | | 250 | 300 |
| A-7 | 1-hexene | 3.0 | 4.0 | | 0.921 | 0.25 | 1.43 | 115.0 | 118.4 | | | 250 | 300 |
| A-8 | 1-hexene | 5.3 | 4.3 | | 0.904 | 2.10 | 7.36 | 110.2 | 111.6 | | | 260 | 320 |

*1 Value of 80 × exp (−100(d − 0.88) + 0.1
*2 Value of 400 × d − 250
*3 Value of 2.2 × MFR$^{-0.84}$
*4 Value of 75 × MFR

Example 9

To 100 parts by weight of the ethylene/α-olefin copolymer (A-8), 20 parts by weight of butane and 1 part by weight of talc were added, and they were melt kneaded and then extrusion foamed by an extruder to prepare a foamed sheet having a thickness of 1 mm. The foamed sheet was evaluated on TREF and cell uniformity. The results are set forth in Table 2.

Example 10

To 100 parts by weight of the ethylene/α-olefin copolymer (A-6), 10 parts by weight of azodicarbonamide (decomposition type blowing agent) was added, and they were melt kneaded and then extruded by an extruder to obtain a sheet. The sheet was irradiated with electron rays of 4 Mrad to prepare a crosslinked sheet. The crosslinked sheet was heated to 230° C. to prepare a foamed sheet. The foamed sheet was evaluated on TREF and cell uniformity. The results are set forth in Table 2.

Example 11

A foamed sheet was prepared in the same manner as in Example 10, except that the copolymer (A-7) was used instead of the ethylene/α-olefin copolymer (A-6) The foamed sheet was evaluated on TREF and cell uniformity. The results are set forth in Table 2.

Example 12

A foamed sheet was prepared in the same manner as in Example 10, except that the copolymer (A-8) was used instead of the ethylene/α-olefin copolymer (A-6). The foamed sheet was evaluated on TREF and cell uniformity. The results are set forth in Table 2.

TABLE 2

| Example | Co-polymer | TREF % *5 | Expansion ratio | Cell uniformity *6 | $t_{10}/t_0$ | Tensile strength (MPa) |
|---|---|---|---|---|---|---|
| Ex. 1 | A-1 | 3.3 | 30 | o | 0.93 | |
| Comp. Ex. 1 | B-1 | 40.1 | 13 | x | | 5 |
| Comp. Ex. 2 | B-2 | 0.0 | 25 | o | 0.65 | |
| Ex. 2 | A-2 | 4.9 | 34 | o | | |
| Ex. 3 | A-3 | 1.5 | 35 | o | | |
| Ex. 4 | A-4 | 4.8 | 34 | o | | |
| Ex. 5 | A-5 | 4.5 | 38 | o | | |
| Ex. 6 | A-1 | 3.3 | 35 | o | | |
| Ex. 7 | A-6 | 3.5 | 25 | o | 0.92 | 20 |
| Ex. 8 | A-7 | 4.8 | 25 | o | | |
| Ex. 9 | A-8 | 1.3 | 26 | o | | |
| Ex. 10 | A-6 | 3.5 | 30 | o | | |
| Ex. 11 | A-7 | 4.8 | 30 | o | | |
| Ex. 12 | A-8 | 1.3 | 30 | o | | |

*5 Elution amount at 100° C. or above in the TREF elution curve
*6 o: excellent uniformity x: poor uniformity

What is claimed is:
1. An ethylene resin foamed product comprising an ethylene/α-olefin copolymer which is a copolymer of ethylene and an α-olefin of 3 to 12 carbon atoms and meets the following requirements:
   (i) the density is in the range of 0.880 to 0.940 g/cm³,
   (ii) the melt flow rate (MFR) at 190° C. under a load of 2.16 kg is in the range of 0.1 to 20 g/10 min,
   (iii) the decane-soluble component fraction (W (% by weight)) at room temperature and the density (d (g/cm³)) satisfy the following relation
   in case of MFR≦10 g/10 min:

W<80×exp(−100(d−0.88))+0.1, in case of MFR>10 g/10 min:

$$W<80\times(MFR-9)^{0.26}\times\exp(-100(d-0.88))+0.1,$$

and (iv) the temperature (Tm (° C.)) at the maximum peak position in the endothermic curve as measured by a differential scanning calorimeter (DSC) and the density (d (g/cm$^3$)) satisfy the following relation
Tm<400×d−250.

2. The ethylene resin foamed product as claimed in claim 1, wherein the ethylene/α-olefin copolymer further meets, in addition to the requirements (i) to (iv), the following requirements:

(v) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation
FI>75×MFR, and (vi) the melt tension (MT (g)) at 190° C. and the melt flow rate (MFR (g/10 min)) satisfy the following relation
MT>2.2×MFR$^{-0.84}$.

3. The ethylene resin foamed product as claimed in claim 1, wherein the ethylene/α-olefin copolymer further meets, in addition to the requirements (i) to (iv), the following requirements:

(vii) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation
FI>150×MFR, and (viii) the melt tension (MT (g)) at 190° C. and the melt flow rate (MFR (g/10 min)) satisfy the following relation
MT>4.0×MFR$^{-0.65}$.

4. The ethylene resin foamed product as claimed in claim 1, wherein the ethylene/α-olefin copolymer is a copolymer of 4 to 12 carbon atoms and further meets, in addition to the requirements (i) to (iv), the following requirements:

(ix) the flow index (FI (1/sec)), which is defined as a shear rate at which the shear stress of said copolymer in a molten state at 190° C. reaches 2.4×10$^6$ dyne/cm$^2$, and the melt flow rate (MFR (g/10 min)) satisfy the following relation
FI≦75×MFR.

5. The ethylene resin foamed product as claimed in any one of claims 1 to 4, wherein the ethylene/α-olefin copolymer is a copolymer obtained by copolymerizing ethylene and an α-olefin of 3 to 12 carbon atoms in the presence of an olefin polymerization catalyst comprising:

(a) a compound of a transition metal of Group IV of the periodic table, which contains a ligand having cyclopentadienyl skeleton, and (b) an organoaluminum oxy-compound.

6. The ethylene resin foamed product as claimed in any one of claims 1 to 4, wherein when the ethylene/α-olefin copolymer is subjected to a temperature rise elution test (TREF), a component that is eluted at a temperature of not lower than 100° C. is present in the copolymer and the amount of the component that is eluted at a temperature of not lower than 100° C. is not more than 10% of the whole elution amount.

7. An ethylene resin foamed product comprising crosslinked polyethylene obtained by crosslinking the ethylene/α-olefin copolymer of any one of claims 1 to 4.

8. The ethylene resin foamed product as claimed in claim 5, wherein when the ethylene/α-olefin copolymer is subjected to a temperature rise elution test (TREF), a component that is eluted at a temperature of not lower than 100° C. is present in the copolymer and the amount of the component that is eluted at a temperature of not lower than 100° C. is not more than 10% of the whole elution amount.

9. An ethylene resin foamed product comprising crosslinked polyethylene obtained by crosslinking the ethylene/α-olefin copolymer of claim 5.

10. An ethylene resin foamed product comprising crosslinked polyethylene obtained by crosslinking the ethylene/α-olefin copolymer of claim 6.

11. An ethylene resin foamed product comprising crosslinked polyethylene obtained by crosslinking the ethylene/α-olefin copolymer of claim 8.

* * * * *